United States Patent [19]

Binggeli et al.

[11] Patent Number: 5,074,018
[45] Date of Patent: Dec. 24, 1991

[54] METHOD AND DEVICE FOR THE CUTTING OF PIPES INTO SEPARATE PIPE SECTIONS

[75] Inventors: Rudolf Binggeli, Meisterschwanden; Fritz Langmeier, Villigen, both of Switzerland

[73] Assignee: Emil Suter Maschinenfabrik AG, Seon, Switzerland

[21] Appl. No.: 533,862

[22] Filed: Jun. 6, 1990

[30] Foreign Application Priority Data

Jun. 13, 1989 [CH] Switzerland .................. 02196/89

[51] Int. Cl.⁵ .................. B21B 15/00; B23B 3/06
[52] U.S. Cl. .................. 29/413; 29/414; 29/33 T; 29/33 S; 82/58; 82/70; 82/94; 83/343
[58] Field of Search .................. 29/412–414, 29/33 D, 33 S, 33 T; 82/46–48, 59, 70, 79, 53.1, 54, 56, 82, 98, 57, 58, 92–97, 86, 89; 83/54, 343, 371, 346; 72/49, 50, 70, 72; 493/288, 290

[56] References Cited

U.S. PATENT DOCUMENTS

| 3,133,483 | 5/1964 | Glasby | 493/290 |
| 3,564,707 | 2/1971 | Ensign | 29/413 |
| 3,813,972 | 6/1974 | Van Alsburg | 82/97 X |
| 4,220,077 | 9/1980 | Miller et al. | 93/80 |
| 4,706,481 | 11/1987 | Castricum | 72/49 |

FOREIGN PATENT DOCUMENTS

| 0206201 | 6/1986 | European Pat. Off. . |
| 834559 | 7/1949 | Fed. Rep. of Germany . |
| 1221183 | 7/1966 | Fed. Rep. of Germany | 72/49 |
| 375316 | 4/1964 | Switzerland . |

Primary Examiner—Larry I. Schwartz
Assistant Examiner—Julie R. Daulton
Attorney, Agent, or Firm—Wegner, Cantor, Mueller & Player

[57] ABSTRACT

A method and apparatus for cutting pipes into sections are described. A punching unit (7) forms apertures (8) in strip (2) from which pipe (4) is formed on winding core (3). A cutting device (5) has a circular shears (10) which has a first, smaller-diameter cutting roller (13) and a second cutting roller (14) each having two cutting edges. The first cutting roller (13) is swivelled through aperture (8) into the pipe (4). Rotary movement of the pipe (4) effects cutting, during which the cutting rollers (13, 14) move in synchronism with the pipe (4) so that the pipe is cut from the inside and the outside by the cutting rollers (13, 14).

20 Claims, 1 Drawing Sheet

METHOD AND DEVICE FOR THE CUTTING OF PIPES INTO SEPARATE PIPE SECTIONS

BACKGROUND OF THE INVENTION

The present invention relates to a method for the cutting of pipes, during the production process, into separate pipe sections with the aid of circular shears having two cutting rollers. The invention further relates to a device for carrying out this method.

In the continuous production of pipes, the pipe sections to be produced were so far cut off by sawing. This led to a high noise level and to sparking with a corresponding danger to the surroundings. It is, however, already known to cut off pipe sections by means of circular shears. Yet the rollers of the circular shears used so far require a large space, so that the cutting of pipes having small diameters is not possible.

SUMMARY OF THE INVENTION

It is an object of the invention to provide a method for the cutting of pipes into single pipe sections, which requires a minimal outlay and permits the cutting of small-diameter pipes. The invention furthermore envisages a cutting device for the carrying out of this method.

According to the invention, the first-mentioned object is achieved by at first producing in the pipes or in their starting material an aperture for each pipe section, into which aperture a cutting roller of the circular shears is later introduced, after which, by rotating the pipe about its longitudinal axis, the pipe section is cut off.

By this method, the cutting roller to be introduced into the pipe can be moved into the latter through the previously produced aperture, e.g., by a simple swivel motion of the circular shears. Since the motion of the cutting edge effecting the cutting-off of the pipe is produced by rotation of the pipe, there is no need for the circular shears to move around the pipe. The method according to the invention is therefore easily carried out and does not require circular shears taking up a large space. It can therefore be used also for pipes of small diameters.

Cutting-off of the pipe sections can be effected without interruption of the production process since, according to an advantageous further aspect of the method, the pipes can maintain their axial advance movement, with the circular shears being correspondingly moved along in the axial direction.

During the cutting process, the circular shears exert no tilting movement on the pipe to be cut, if properly adjusted circular shears are used, provided with cutting rollers having each two cutting edges.

Receiving an appropriate power impulse, the circular shears automatically swivel with one cutting roller moving into the pipe to be cut. This is accomplished by employing circular shears that have cutting rollers of differing diameters. The apertures for introducing the roller are dimensioned only according to the cutting roller having the smaller diameter. In order to introduce the cutting roller, the circular shears are pressed from the outside with the smaller-diameter roller against the rotating pipe, so that the shears with their smaller-diameter roller swivel into the pipe as soon as the aperture is aligned with the smaller-diameter cutting roller.

The punching unit for producing the apertures in the pipe can be made particularly simple, when, according to another development of the method, the apertures are punched into the pipe-forming sheet-metal strip prior to the flanging and winding thereof.

During the cutting process which takes place in the circumferential direction, the circular shears need not perform an undesirable advance movement if, during the cutting process, the speed of advance of the pipes is reduced.

For pipes with very thin walls it is advantageous if the introduction of the smaller-diameter cutting roller is controlled by a photocell monitoring the position of the apertures.

The second object mentioned, namely the cutting device for the cutting of pipes according to the above method, comprises circular shears provided with a smaller-diameter cutting roller for introduction into the pipe to be cut via an aperture therein, and a larger-diameter cutting roller for making contact with the outer wall surface of the pipes.

Such a cutting device advantageously demands relatively little space. It is therefore also suitable for the cutting of pipes of smaller diameters. Its simple design is largely made possible by the fact that it need not perform an advance movement around the pipe to be cut. Since the cutting device seats itself with its larger-diameter cutting roller onto the outside of the pipe to be cut, the latter automatically maintains the circular shears in the proper position. The circular shears according to the invention therefore need no costly positioning means.

It is particularly advantageous if each of the cutting rollers is provided with two cutting edges.

The circular shears can work without interrupting the pipe production process during the pipe advance movement if, according to an advantageous embodiment, the circular shears are slidably arranged on a longitudinal guide member oriented in a direction parallel to the pipe to be cut.

During the cutting process the pipe to be cut is subjected to a particularly low degree of torsional stress, if at least one of the cutting rollers is motor-driven.

The longitudinal movement of the circular shears, with the pipe being produced can be realized by the provision of an advance motor for the moving of the circular shears on their longitudinal guide member in sychronism with the speed of the emerging pipe.

Such an advance motor can, however, be dispensed with thereby further simplifying the device if, in a further development of the invention, the circular shears on their longitudinal guide member are adapted to be freely slidable in direction of advance, and a resetting cylinder is provided for returning the circular shears after every cutting episode.

The swiveling, into the working position, of the circular shears, is particularly simplified if, according to another advantageous development of the invention, the circular shears are adapted to swivel about the longitudinal guide member oriented in a direction parallel to the pipe to be cut and is provided with an arm abutting against a swivel cylinder for swiveling the shears into the working position.

BRIEF DESCRIPTION OF THE DRAWINGS

The invention permits numerous embodiments. For further elucidation of the method and the device according to the invention, reference is made to the drawings. In these drawings.

DETAILED DESCRIPTION OF THE PRESENT INVENTION

Figure 1:
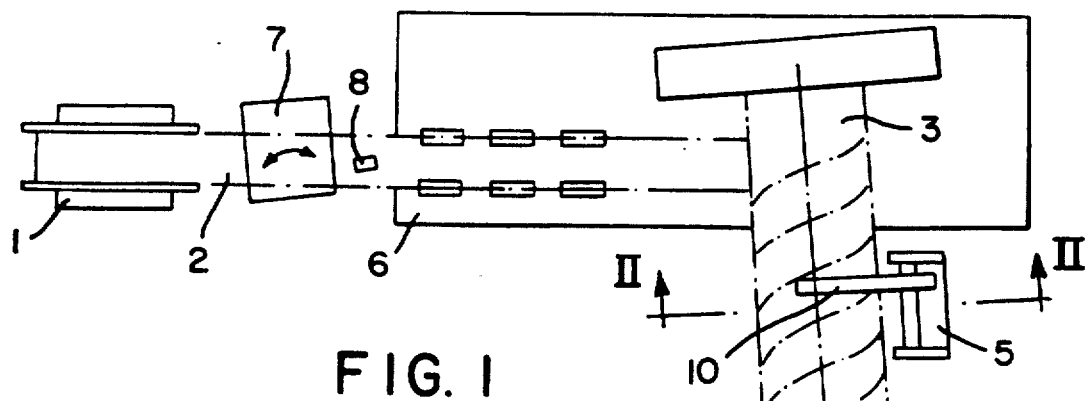
FIG. 1 is a schematic top view of a pipe-producing installation comprising a cutting device for cutting-off of pipes.

In FIG. 1 there is seen a roll, a so-called coil reel 1, from which a strip 2 is fed to a winding core 3. On this winding core 3 a continuous, or endless, pipe 4, a so-called spiral pipe is produced, from which pipe sections are to be cut by means of a cutting device 5. Preceding the winding core 3 is a conventional flanging unit 6, by means of which the edges of the strip 2 are shaped. Between the flanging unit 6 and the coil reel 1 there is located a punching unit 7, by means of which apertures 8 are punched at predetermined intervals into the still unwound strip 2. The punching unit 7 must be arranged somewhat slantingly relative to the strip 2, as the latter is wound onto the core 3 in a helical form. For controlling the cutting device there is provided a limit switch 9, which initiates the cutting process when impacted by the merging pipe 4. Actuating of this limit switch 9 causes at the same time the production speed to be reduced from, e.g. 80 m/min. to, e.g. 12 to 15 m/min.

Figure 2:
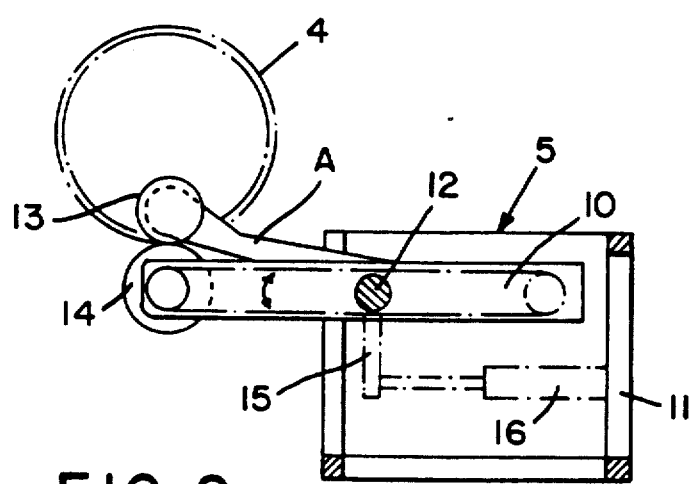
FIG. 2 shows a cross-sectional view, at an enlarged scale with respect to FIG. 1, of the installation in the region of the cutting device, along line II—II in FIG. 1.

FIG. 2 illustrates the design of the cutting device 5. The latter is provided with circular shears 10, arranged in a frame 11 on a longitudinal guide member 12 and being adapted to swivel about, and slide along, the guide member. The circular shears 10 have two cutting rollers 13, 14 of differing diameters. The smaller-diameter cutting roller 13 is of such dimensions and design as to enter the pipe 4, together with its carrier arm A, through the aperture 8 shown in FIG. 1, after which the cutting process can take place by rotation of the pipe 4.

As seen in FIG. 2, a downward pointing arm 15 is fixedly attached to the circular shears, which arm abuts against a swivel cylinder 16. If pneumatic pressure is applied to the latter, the circular shears tend to swivel in the clockwise sense. To initiate the cutting process, the circular shears are made to contact the outer wall surface of the pipe 4 with their cutting roller 13 and pressure is applied to the swivel cylinder 16. If now, due to the rotation and advance motion of the pipe 4, the cutting roller 13 comes into alignment with the aperture 8 in the pipe 4, the circular shears 10, with their cutting roller 13, will automatically swivel into the pipe 4 until the cutting roller 14 makes contact with the outer pipe surface, after which the cutting process may begin.

Figure 3:
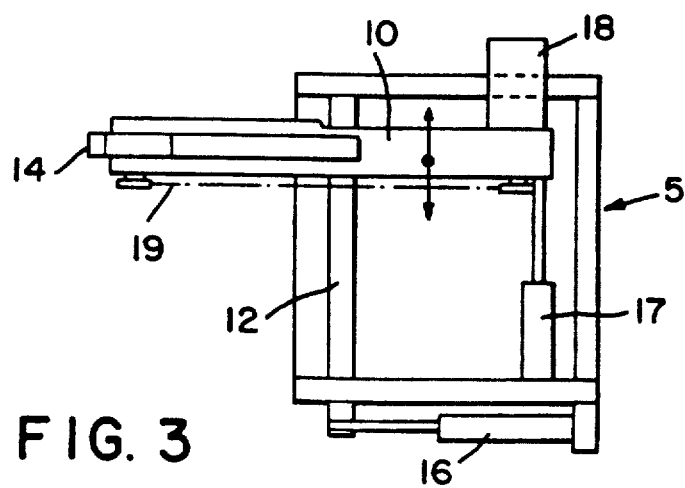
FIG. 3 is a top view of the cutting device.

Seen in top view in FIG. 3 is the manner in which the circular shears 10 are slidably arranged on their longitudinal guide member 12. During the cutting process, the circular shears 10 move from the initial position shown, to the opposite side of the cutting device 5. After that, the cutting device is swung out of the pipe 4 by actuating the swivel cylinder 16. Subsequently, a resetting cylinder 17 is used to return the circular shears 10 to their initial position. The embodiment shown thus requires no advance drive for the circular shears 10. Shown in FIG. 3 is, however, a drive 18 by means of which the cutting roller 14 is drivable via a chain 19.

Figure 4:
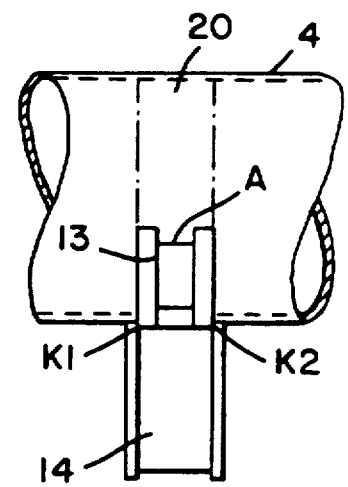
FIG. 4 is a view of the pipe to be cut, including two cutting rollers of the cutting device engaging the pipe.

In FIG. 4 it can be seen that the cutting rollers 13, 14 have two cutting edges K1 and K2. Due to this fact, a strip 20 is cut out from the pipe 4 by the cutting process.

The object of the invention has proved its worth particularly in the manufacture of galvanized, spirally-wound pipes for ventilation and air-conditioning applications.

Practical experience has shown that, using the method and the device according to the invention, galvanized, spirally-wound ventilation pipes with sheet-metal thickness of 0.2 mm to 1.25 mm and diameters of 60 mm to 2200 mm can be cut to length without any problems.

It is obviously possible to cut also non-coated pipes and/or pipes made of stainless steel or of other materials such as aluminum alloys, etc.

By means of a control circuit, the object of the invention is easily connected with a simple microprocessor so that the apertures to be provided in the starting material are optimally positioned in dependence on the desired length, the pipe diameter and the pitch of the pipe winding helix.

The method and the device are readily integrated into automated manufacture (CIM) and appropriately adapted to production demands.

What is claimed is:

1. A method for forming pipe sections from strip, comprising:
   (a) punching apertures at predetermined intervals in a strip;
   (b) winding said strip to form pipe having apertures on the outer surface of said pipe; and
   (c) cutting said pipe into pipe sections with a circular shears having a first cutting roller and a second cutting roller, the diameter of said first cutting roller being less than the diameter of said second cutting roller so that only the first cutting roller can fit through each said aperture, wherein said cutting includes repeating the following steps: (i) rotationally advancing the pipe, aligning the fist cutting roller with one said aperture int eh pipe and introducing the first cutting roller radially through the one said aperture and into the pipe, (ii) contacting the inside surface o the pipe with the first cutting roller and the outside surface of the pipe with he second cutting roller, (iii) rotating the pipe between the fist cutting roller and the secçnd cutting roller until a pipe section is cut and separated from said pipe, and (iv) moving the first cutting roller outside of The pipe.

2. A method as recited in claim 1, wherein the fist cutting roller and the second cutting roller both have two cutting edges.

3. A method as recited in claim 1, wherein at least one of said first cutting roller and said second cutting roller is driven by a motor.

4. A method as recited in claim 1, wherein said first cutting roller is inserted inside the pipe and moved outside of the pipe by swivel means.

5. A method as recited in claim 1, further comprising flanging the strip prior to said winding.

6. A method as recited in claim 1, wherein he strip is sheet metal.

7. A method as recited in claim 1, wherein in step (i) of said cutting, the fist cutting roller is pressed against the outside of the advancing pipe until the first cutting roller aligns with the one said aperture and swivels into The pipe.

8. A method as recited in claim 1, wherein step (i) of aid cutting further includes monitoring the position of the one said aperture, and controlling he introduction o the first cutting roller through the one said aperture and into the pipe in response to the monitored position.

9. A method as recited in claim 1, wherein during said cutting the speed of advance o the pipe is reduced.

10. A method as recited in claim 1, wherein said cutting is carried out while the pipe is continuously advanced.

11. A method as recited in claim 10, wherein eh circular shears is longitudinally moved in synchronism with the advancement of the pipe.

12. An apparatus for forming pipe sections from strip, comprising:

(a) punching means for forming apertures at predetermined intervals in a strip;

(b) winding means for winding the strip to form pipe having apertures on the outer surface of said pipe and for rotationally advancing the pipe; and (c) a circular shears for cutting the pipe into pipe sections, said circular shears including:

(i) a first cutting roller and a second cutting roller, the diameter of said first cutting roller being less than the diameter of said second cutting roller so that only the first cutting roller can fit through each said aperture, and (ii) roller positioning means for introducing the first cutting roller radially through one said aperture and into the pipe, positioning the first cutting roller in contact with the inside of the pipe and second cutting roller in contact with the outside o the pipe, and moving the first cutting roller to a position outside of the pipe.

13. An apparatus as recited in claim 12, wherein said first cutting roller has two cutting edges and said second cutting roller has two cutting edges.

14. An apparatus as recited in claim 12, further comprising means for driving at least one of said first cutting roller and said second cutting roller.

15. An apparatus as recited in claim 12, further comprising moving means for longitudinally moving the circular shears in the direction of the advancement of the pipe.

16. An apparatus as recited in claim 15, wherein said moving means include a longitudinal guide member oriented in a direction parallel to said pipe, sand means for slidably mounting said circular shears on said longitudinal guide member.

17. An apparatus as recited n claim 16, wherein said moving means further include an advance motor for moving said circular shears mounted on said said longitudinal guide member in synchronism with the speed of the advancing pipe.

18. An apparatus as recited in claim 16, wherein said moving means further include a resetting cylinder for returning said circular shears to a desired position.

19. An apparatus as recited in claim 16, wherein said roller positioning means include swivel means for swiveling the circular shears about the longitudinal guide member into and out of cutting position.

20. An apparatus as recited in claim 19, wherein said first cutting roller is mounted on a carrier arm pivotally connected to said longitudinal guide member, and said swivel means include a swivel arm connected to said longitudinal guide member and a swivel cylinder connected to said swivel arm, whereby actuation of said swivel cylinder moves said swivel arm to axially rotate said longitudinal guide member, thereby swiveling said carrier arm and positioning said first cutting roller into the pipe for cutting or out of the pipe when cutting is competed.

* * * * *